United States Patent [19]

Jobin

[11] Patent Number: 4,634,244
[45] Date of Patent: Jan. 6, 1987

[54] FLASHING DEVICE FOR MOTION PICTURE CAMERA

[76] Inventor: Daniel Jobin, 4136 St-Christophe, Montreal, Quebec, Canada, H2L 3Y2

[21] Appl. No.: 809,043

[22] Filed: Dec. 16, 1985

[51] Int. Cl.$^4$ .............................................. G03B 23/02
[52] U.S. Cl. ...................................... 352/72; 352/85; 354/202
[58] Field of Search ............. 352/72, 85; 354/202 FF

[56] References Cited

U.S. PATENT DOCUMENTS

| | | |
|---|---|---|
| 3,484,165 | 12/1969 | Denner . |
| 3,528,737 | 9/1970 | Denner . |
| 3,577,898 | 5/1971 | Bragg . |
| 3,819,376 | 6/1974 | Land . |
| 3,823,413 | 7/1974 | Cole . |
| 3,827,071 | 7/1974 | Turpin . |
| 3,936,852 | 2/1976 | Turpin . |
| 3,953,210 | 4/1976 | Hasegawa . |
| 4,011,081 | 3/1977 | Gilman . |
| 4,172,640 | 10/1979 | Land . |
| 4,298,255 | 11/1981 | Gottschalk .................. 354/202 FF |

FOREIGN PATENT DOCUMENTS

| | | |
|---|---|---|
| 852497 | 9/1970 | Canada . |
| 1037759 | 9/1978 | Canada . |
| 1122453 | 4/1982 | Canada . |

*Primary Examiner*—Monroe H. Hayes
*Attorney, Agent, or Firm*—Robic, Robic & Associates

[57] ABSTRACT

A flashing device attachable to a motion picture camera having a body provided with an objective lens aperture and with at least two magazine apertures over one of which may be detachably mounted a film magazine. The camera comprises a driving mechanism inside its body to move the film stored in the magazine and passing it through one magazine aperture over which the magazine is mounted, in front of the lens aperture in order to expose the successive frames of this film to the light of a scene to be recorded. A casing provided with an opening closed by a ground glass is detachably mounted onto the body of the camera over the other magazine aperture with the opening of the casing facing the other magazine aperture. A lamp is mounted inside the casing for directing light onto the ground glass closing the opening of the casing and therefrom through this opening and its facing aperture, onto the film moving through the body of the camera in order to subject the film to a supplemental uniform exposure. A photocell is mounted inside the casing so as to face the ground glass for measuring directly onto the surface of the glass the intensity of the light directed thereto by the lamp. A diagram is also provided for adjusting the intensity of the light directed onto the ground glass by the lamp. If desired, or colormeter may be mounted inside the casing for measuring the color of the light directed onto the ground glass by the lamp and a set of fitters may be used for adjusting the color of the light directed onto the ground glass by the lamp.

6 Claims, 2 Drawing Figures

FLASHING DEVICE FOR MOTION PICTURE CAMERA

BACKGROUND OF THE INVENTION (a) Field of the Invention

The present invention is concerned with a flashing device attachable to a motion picture camera for subjecting the film just before or after its principal exposure through the camera's lens aperture to a supplementary uniform exposure in order to achieve a visual effect such as, for example, a fogging effect, a color mood effect or an enhancement of latent images.

(b) Brief Description of the Prior Art

Flashing is a well-known photographic technique which basically consists in subjecting a negative film to a low-intensity exposure that is uniform and non-image-forming prior to development, in order to achieve some visual effect such as:

a fogging effect, due to a reduction of the contrast (neutral flashing);

a color mood effect, due to an alteration of the normal color rendition of the developed negative (non neutral flashing);

to obtain a higher effective emulsion speed in connection with force development without altering the photographic quality;

the reduction of the fill light used when recording scene; and the matching of films that were differently exposed.

In practice, flashing can be carried out before, during or after normal exposure of the films, that is during its fabrication (see, for example, U.S. Pat. No. 3,819,376), during its exposure to an image-forming light in a camera (see for example, U.S. Pat. Nos. 3,577,898; 3,528,737; 3,823,413; 3,827,071; 3,936,852 and 4,172,640) or during its development (see U.S. Pat. No. 3,455,633).

It is technically recognized in the literature that there is no substantial difference in effect if flashing is carried out before, during or after normal exposure of the film although flashing carried out during normal exposure has some advantages as compared to the pre-and post-exposure, such as:

to allow variation of the flashing effect during exposure of a scene;

to allow compensation of variation in colour transmissability between two lenses when different lenses are used for filming a scene;

to allow correlation of any supplementary speed-enhancing light in accordance with the scene light; and/or to check immediately the effect of these variation, compensation and/or correlation when use is made of special devices as disclosed in U.S. Pat. Nos. 3,827,071 and 3,936,852, which devices are attachable to the front of the objective lens of a camera for directing additional light directly to this lens to supplement the light reaching the film from the scene being recorded.

In addition to allow immediate verification of the flashing effect through the objective lens of the camera, the special devices disclosed in U.S. Pat. Nos. 3,827,071 and 3,936,852 have the substantial advantage of being usable with any kind of cameras without having to alter the structure of the objective lenses, as is called for in U.S. Pat. Nos. 3,577,898 and 3,528,737.

In spite of these advantages, these special devices are not used as much as they should in the motion picture industry because of their costs which are rather high, of their weights which are substantial, and of the difficulties they bring out when one wants to exchange one lens for another.

As an alternative to these devices, U.S. Pat. No. 4,172,640 issued on Oct. 30, 1979 to POLAROID CORP. discloses a cassette holding motion picture camera comprising a built-in supplemental exposure system. The supplementary exposure light generated by a small lamp housed in a lateral chamber is directed to the side of the film which is opposite to the side exposed to the image forming light passing through the objective lens, by means of an optical prism incorporated into the film cassette. An electronic circuit is provided to adjust the flashing intensity and duration of the supplementary light which is switched on in synchronization with the opening of the objective shutter. A filter disc insert is also provided to allow insertion of filters of different intensities in such a position as to vary and control the wavelengths of the light directed to the film.

The flashing system disclosed in this U.S. Pat. No. 4,172,640 has numerous advantages including, inter alia, the fact that it is light and it allows the operator to change the objective lenses of the camera in a very easy manner whenever desired. This flashing system however is of the built-in type, thereby restricting its use to a given type of camera and cassette.

SUMMARY OF THE INVENTION

An object of the present invention is to provide a new kind of flashing device attachable to a movie camera for subjecting the film to a supplementary uniform exposure just before or after its principal exposure through the camera's lens aperture, which device overcomes each of the above mentioned drawbacks of the prior art devices.

More particularly, the object of the present invention is to provide a flashing device which is not very expensive, which is light in weight and can be detachably mounted onto any motion picture camera having a body provided with at least two magazine apertures over one of which may be detachably mounted a film magazine. In such a manner the flash device according to the invention does not interfere with the objective lens of the camera and thereby makes any change of lens very easy to carry out.

Another object on the present invention is to provide a flashing device of the above mentioned type, which device includes very simple and effective means for precisely measuring and adjusting the intensity of the supplementary exposure light directed to the film, as well as for precisely measuring and adjusting the color of said supplementary light.

In its broadest aspect, the flashing device according to the invention is intended to be used as an attachment to a motion picture camera which has a body provided with an objective lens aperture and with at least two magazine apertures over one of which may be detachably mounted the film magazine, and which comprises a driving mechanism inside its body to move the film stored in the magazine and pass it through the one magazine aperture and then in front of the lens aperture in order to expose the successive frames of this film to the light of a scene to be recorded.

An example of a suitable motion picture camera having such a structural requirement is the well known 35 mm movie camera rent under the trademark PANA- FLEX or the one sold under the trade mark MITCHELL R-35.

The flashing device according to the invention basically comprises:

a casing provided with an opening closed by a ground glass;

means for detachably mounting the casing into the body of the camera over its other magazine aperture which is not covered by the film magazine, with the opening of the casing facing this other magazine aperture;

lighting means mounted inside the casing for directing light onto the ground glass closing the opening of the casing and, therefrom, through said opening and its facing aperture, onto the film moving through the body of the camera in order to subject this film to a supplemental uniform exposure;

means mounted inside the casing and facing the grouond glass for measuring directly onto the surface of this glass the intensity of the light directed thereto by the lighting means; and means for adjusting the intensity of the light directed onto the ground glass by the lighting means.

In accordance with a preferred embodiment of the invention, the flashing device may further comprise:

means mounted inside the casing for measuring the color of the light directed onto the ground glass by the lighting means; and means for adjusting the color of the light directed to the ground glass by this lighting means.

Advantageously, the lighting means may comprise a low voltage lamp mounted behind a neutral density filter and behind a condensing lens used to uniformly distribute the light generated by the lamp. If desired, a voltage transformer connectable to a standard electrical power source may be incorporated into the structure of the flashing device to drop the voltage of this external power source to the low voltage value of the lamp.

The intensity measuring and intensity adjusting means may respectively comprise a photocell connected to an exposure meter via a light amplifier and a manually controlled diaphragm mounted inside the casing between the light means and ground glass.

Similarly, the color measuring and color adjusting means may respectively comprise a color-meter giving a temperature signal representative of the color of the light inside the casing close to the ground glass, and at least to one interchangeable filter mounted inside the casing between the lighting means and the ground glass.

As can now be understood, the fact that the flashing device according to the invention is attachable to a built-in film aperture forming part of the body of a camera, makes this flashing device very easy to install and use, in addition to making it possible to change the camera lens whenever desired without having to remove and reinstall the flashing device. Moreover, the flashing device according to the invention makes use of a standard exposure meter and a standard color meter as light intensity and color measuring means, respectively. These kinds of meters are well known for their accuracy, thereby making the flashing device according to the invention very reliable in use.

BRIEF DESCRIPTION OF THE DRAWINGS

The basic structure of the invention and its numerous advantages will be better understood upon reading the following description of a preferred embodiment thereof, given with reference to the accompanying drawings in which.

DESCRIPTION OF A PREFERRED EMBODIMENT

Figure 1:
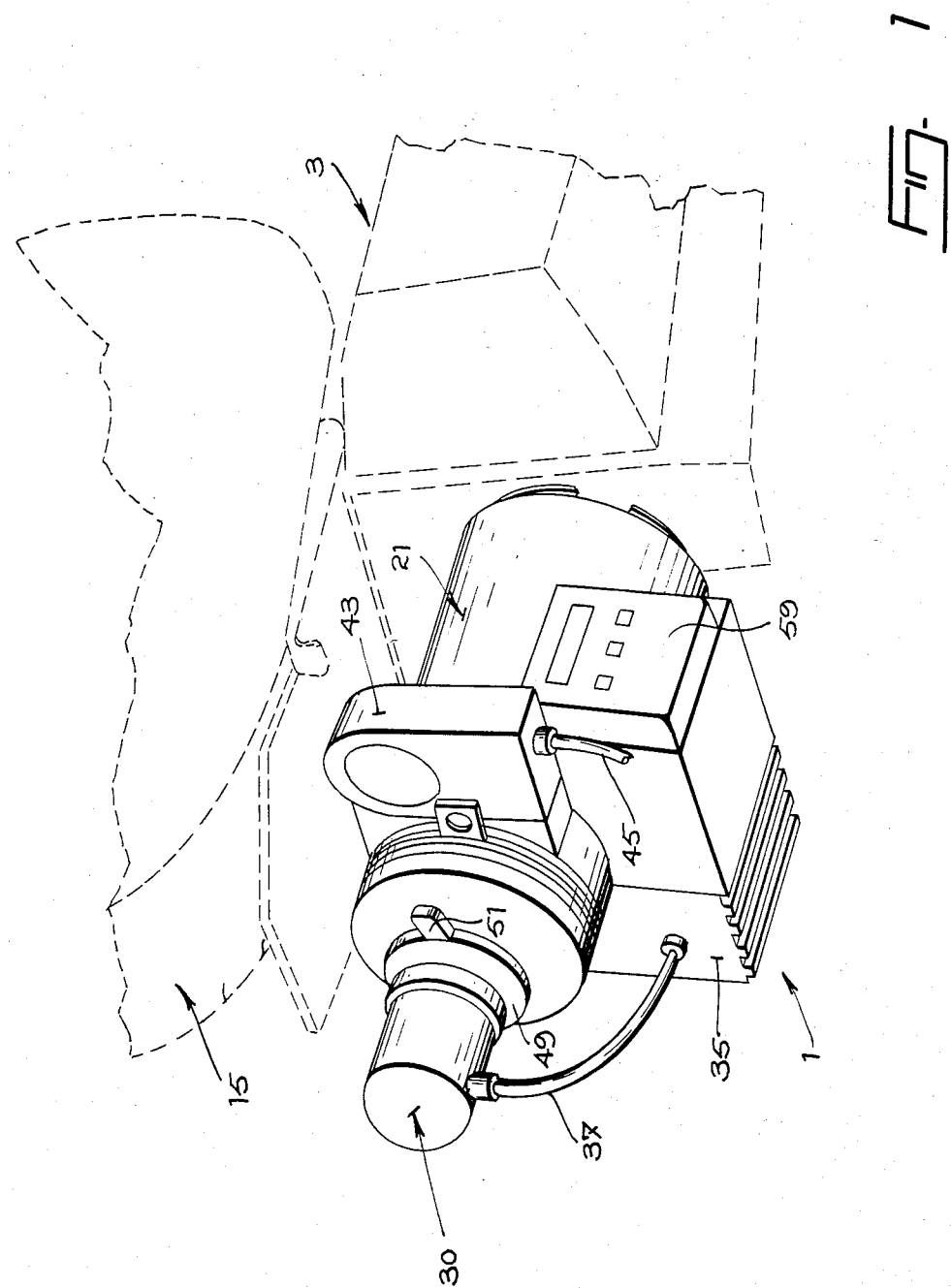
FIG. 1 is a rear perspective view of a motion picture camera provided with a flashing device according to the invention.

The flashing device 1 according to the invention as shown in the accompanying drawings, is intended to be used as an attachment to a motion picture camera 3 for subjecting a film 5 to be recorded just before or after its principal exposure through the camera's objective lens aperture 7, to a supplemental uniform exposure in order to achieve a flashing effect.

The flashing device 1 can be used with any kind of motion picture camera, provided however than the body 9 of this camera comprises at least two magazine apertures 11 and 13 over one of which may be detachably mounted a film magazine 15. An example of such a motion picture camera is the 35 mm camera rent under the trademark PANAFLEX.

Except for the above mentioned particular proviso, the camera 3 may be of any conventional design, including a shutter control mechanism (not shown) and an internal drive mechanism 17 for pulling the film 5 to be recorded from one spool 17 of the magazine 15, passing the film through the aperture 11 onto which the magazine is mounted, subsequently passing this film in front of the lens aperture 7 in order to expose the successive frames of this film to the light of a scene to be recorded, and then to return the so exposed film to another spool 17' provided in the magazine 15. Of course, the basic structure of the camera 1 and the way its structural elements work together to record a film, are well known in the art and will not be described hereinafter in greater detail, except to indicate that, up to now, the only purpose of using a camera with two magazine apertures 11 and 13 was to give some freedom to the cameraman, the plurality of apertures making it possible to place the magazine on top or behind the camera's body.

Of course, one may also easily understand that when recording a film, the magazine aperture which is not used for mounting the magazine 15, has to be closed by a cap or by any similar means to prevent light from entering inside the body 9 of the camera.

Figure 2:
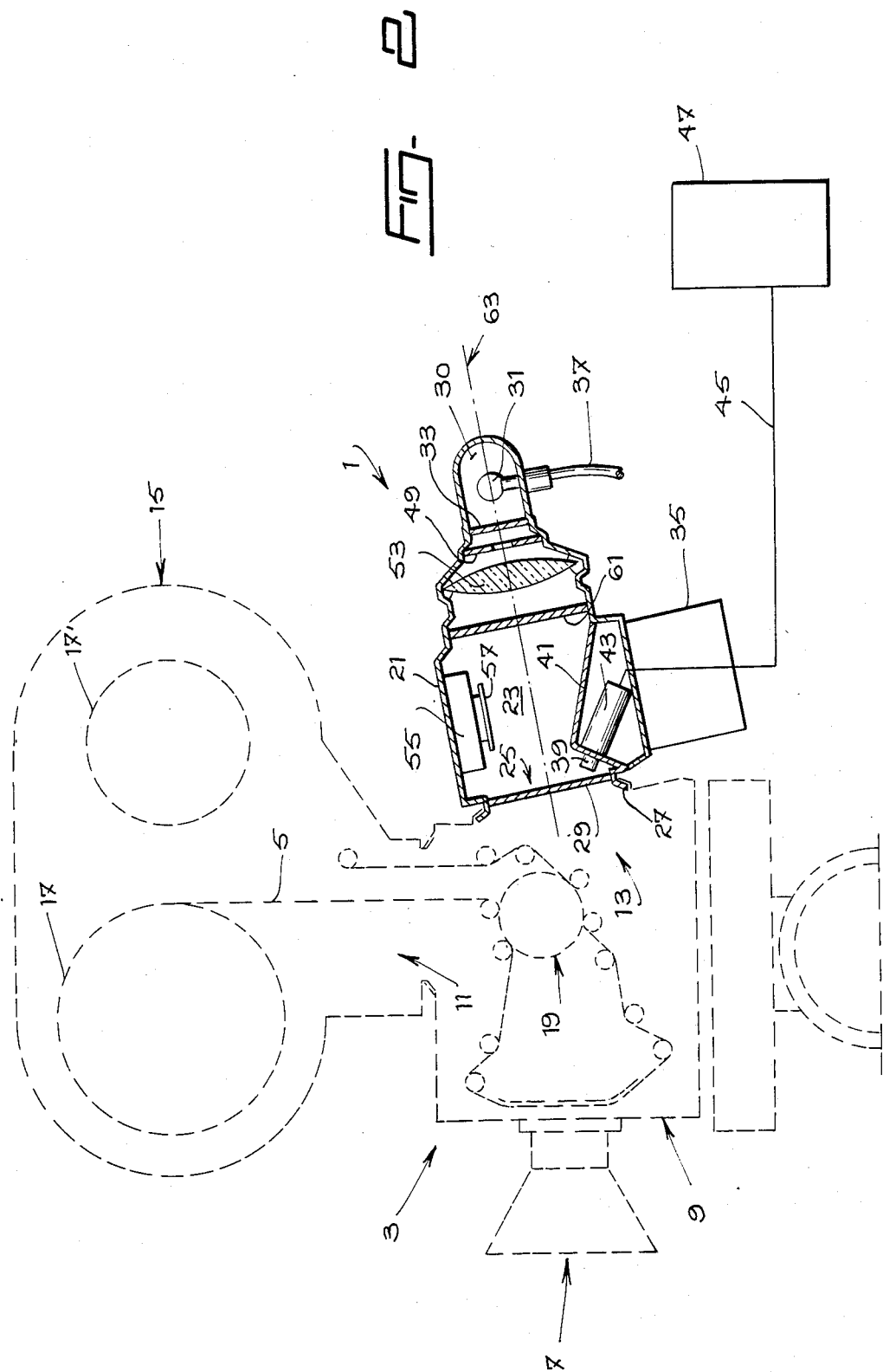
FIG. 2 is a diagrammatic, cross-sectional view of the flashing device shown in FIG. 1.

As better shown in FIG. 2, the flashing device 1 comprises a casing 21 defining an internal chamber 23 provided with an opening 25. The device 1 also comprises means 27 for detachably mounting the casing 1 onto the body 9 of the camera 3 over the film aperture 13 over which the magazine is not mounted. The mounting means 27 must, in pracice, be structurally indentical to the standard mounting means of the magazine 15 to make the flashing device easily attachable to the camera as the magazine 15 is, without modifying the structure and body of the camera. In pracice, this mounting means may consist of a dovetail-shaped slider insertable into a slot provided into the body 9 of the camera. In accordance with the invention, it is however compulsory that this mounting means be positioned with respect to the casing in such a manner that the opening 25 of the casing faces the film aperture 13 when the flashing device 1 is mounted onto the camera 3.

The chamber 23 defined inside the casing 21 of the flashing device 1 is separated from the internal chamber of the camera by means of a piece of light diffusing ground glass 29 that can be made of glass as such or of PLEXIGLASS (trademark). Of course, this ground glass 29 must extend transversally all over the opening 25.

Lighting means consisting of a low voltage lamp 31 mounted behind a neutral density filter 33 into a recess 30 provided in the chamber 23, are provided inside the casing 21 opposite to the operation 25 for directing light onto the ground glass 29 closing the opening 25 of the casing and therefrom, through this opening and its facing aperture 13, onto the film 5 moving through the body 9 of the camera in order to subject this film to a supplementary uniform exposure. In the particular embodiment shown in FIGS. 1 and 2, such a supplementary exposure occurs just after the film 5 has been subjected to its principal exposure o the light of the scene to be recorded. If, however, the flashing device 1 and magazine 15 were interchanged, supplementary exposure would occur just before the film 5 is subjected to its principal exposure through the lens aperture 7.

The low-voltage lamp 31 may be a standard halogen lamp of 5 watt/12 volts, such as the one sold under the trademark COPILOT"K" 64111 by the firm OSRAM. This lamp 31 may be electrically supplied by a voltage transformer 35 forming part of the device 1, which transformer 35 is connected to the lamp by a cord 37 and connectable to the 24-Volt battery generally used as electrical power source to operate a motion picture camera. The purpose of this transformer 35 is of course to drop the voltage of the standard electrical source to the low voltage value of the lamp 31, thereby making the device 1 according to the invention operable from the same electrical power source as the camera 3, such a power source being usually a 24 volt battery.

In accordance with the invention, means are also mounted inside the casing 21 of the flashing device 1 in such a manner as to face the ground glass 29 extending through the aperture 25 of the chamber 23, in order to measure directly onto the surface of this glass 29 the intensity of the light directed thereto by the lighting means. These intensity measuring means comprise a photocell 39 mounted onto a small support 41 provided into the chamber 23 so as to "read" the lumineous intensity of the lighted surface of the ground glass 29. The photocell 39 is connected to a light amplifier 43 that can be mounted inside the chamber 23 as shown in FIG. 2 or externally thereof as shown in FIG. 1. As amplifier, use can be made of the amplifier sold by MINOLTA under the tradename BOOSTER II.

The amplifier 43 is in turn detachably connected by a cable 45 to an exposure meter 47. The exposure meter 47 can be of any type provided that it gives an indication of the intensity of the light directed onto the ground glass 29. This value can be expressed as a number of E.V. (exposure value), which number may range from 0 to 20.

As exposure meter, use can be made by way of example, of the meter sold by MINOLTA under the tademark AUTO METER III, using a calibration of 1/50 sec. at 125 ASA for a 5247 EASTMAN COLOR negative II film.

In this regard, it is worth noting that exposure meters are well known instruments that are very accurate in use. As a result, any measurement made by the photocell 39, the light amplifier 43 and he exposure meter 47 will give a very accurate indication of the intensity of the light illumating the ground glass 29 and, therefrom, the film 5 moved inside the body of the camera 3 by the drive mechanism 19. This accurate measurement will in turn allow those using the flashing device 1 to adjust the amount of light directed by the lighting system onto the ground glass 29 and thereby to increase or lower the amount of supplementary exposure according to the kind of visual effect requested by the cameraman.

To provide this necessary adjustment of the intensity of ligh directed by the lighting means onto the ground glass 29, means consisting of a manually controlled diaphragm 49 operable by mere rotation of a small external tab 51 (see FIG. 1), are mounted inside the casing 21 just in front of the neutral density filter 33. In order to uniformly distribute the light passing through the opening of the diaphragm 49, a condensating lens 53 may also be provided behind the same, as shown in FIG. 2.

As diaphragm 49, use can be made of any kind of diaphragm having, by way of example, an opening varying from 3.5 to 41.0 mm.

Means may advantageously be mounted inside the casing 21 for measuring the color of the light directed onto the ground glass 29 by the lighting means. These color measuring means may consist of a color-meter like the one sold by MINOLTA under the tradename COLOR METER II, such a meter giving a temperature signal expressed in degree Kelvin, which signal is representative of the color of the light inside the chamber 23 of the casing 21. In this regard, it is reminded that the basic color of a movie camera film is 3200° K. for a tungsten calibrated film.

The measuring cell 55 of the color-meter may be positioned inside the casing 21 so that its axis be perpendicular to the general direction of the light directed from the lamp 31 to the ground glass 29. The opening of this cell 55 may be protected by a small light diffusing ground glass 57 made of PLEXIGLASS or any similar material. The electronic measuring equipment of the color-meter and its display panel 59 may however be located in such a manner as to be of easy access, such as laterally and externally onto the casing 21, as shown in FIG. 1.

Means are provided inside the casing 21 for adjusting the color of the light directed onto the ground glass 29 by the lighting means in order to achieve, for example, a color mood effect.

These color adjusting means may consist of at least one interchangeable filter 61 mounted inside the casing between the lighting means and the ground glass 23. As shown in FIG. 2, the filter 61 may be mounted just in front of the condensating lens 53 at the outlet of the lighting chamber 30. To make the filter 61 interchangeable, the casing 21 may be designed to incorporate in this structure a filter holder, such as, for example, a double 3"×3" filter holder like the one sold under the trademark ARRIFLEX. In practice, a basic filter 61 like the one sold under the tradename WRATTEN KODAK No. 80C may be used to obtain the basic color of 3200K.

Although it is not compulsory, the lamp 31, the neutral density filter 33, the condensing lens 53, the manually controlled diaphragm 49, the interchangeable filter 61 and the ground glass 29 may be mounted on a same axis 63 inside the casing, being understood that the photocell 39 and the cell 55 of the color-meter are offset with respect to this axis 63 as shown in FIG. 2 in order not to interfere with the light directed from the lamp 31 to the ground glass 29.

As can now be easily understood, the flashing device according to the invention is particularly interesting in that it is very simple in structure and it makes use of instruments (exposure meter 47, color-meter 55, diaphragm 49, filter holder) that are well known by those skilled in the art of motion picture. As a result, the flashing device 1 can be used in a very efficient manner.

As can also be understood, the flashing device according to the invention is rather compact in size and attachable to a camera without having to structurally modify this camera. Moreover, this attachment can be made directly to the body of a camera, thereby avoiding any interference with the objective lens of the camera, as it occurrs with the flashing devices disclosed in U.S. Pat. Nos. 3,827,071 and 3,936,852 already mentioned in the preamble of the present specification.

What is claimed is:

1. A flashing device attachable to a motion picture camera having a body provided with an objective lens aperture and with at least two magazine apertures over one of which may be detachably mounted a film magazine, said camera comprising a driving mechanism inside its body to move the film stored in the magazine and passing it through the one magazine aperture over which the magazine is mounted, in front of the lens aperture in order to expose the successive frames of this film to the light of a scene to be recorded, said flashing device comprising:

a casing provided with an opening closed by a ground glass;

means for detachably mounting the casing onto the body of the camera over the other magazine aperture with the opening of said casing facing said other magazine aperture;

lighting means mounted inside the casing for directing light onto the ground glass closing the opening of the casing and therefrom through said opening and its facing aperture, onto the film moving through the body of the camera in order to subject said film to a supplemental uniform exposure;

means mounted inside the casing and facing the ground glass for measuring directly onto the surface of said glass the intensity of the light directed thereto by said lighting means; and means for adjusting the intensity of said light directed onto the ground glass by said lighting means.

2. The flashing device of claim 1, further comprising:
p1 means mounted inside the casing for measuring the color of the light directed onto the ground glass by the lighting means; and means for adjusting the color of said light directed onto the ground glass by said lighting means.

3. The flashing device of claim 2, wherein:

said lighting means comprises a low-voltage lamp mounted behind a neutral density filter;

said intensity measuring means comprises a photocell connected to an exposure meter via a light amplifier;

said intensity adjusting means comprises a manually controlled diaphragm mounted inside the casing between the lighting means and ground glass;

said color measuring means consists of a colormeter giving a temperature signal representative of the color of the light inside the casing close to the ground glass; and said color adjusting means comprises at least one interchangeable filter mounted inside the casing between the lighting means and the ground glass.

4. The flashing device of claim 3, wherein:

said lighting means also comprises a condensating lens to uniformly distribute the light generated by the lamp.

5. The flashing device of claim 4, wherein the lamp, the neutral density filter and the condensating lens of the lighting means, the manually controlled diaphragm of the intensity adjusting means, the interchangeable filter of the color adjusting means and the ground glass closing the opening of the casing, are mounted on a same axis inside the casing whereas the photocell and colormeter are offset with respect to said axis not to interfere with the light directed from the lamp to the ground glass.

6. The flashing device of claim 4, further comprising a voltage transformer connectable to a standard electrical power source to drop the voltage of this source to the low-voltage value of the lamp of the lighting means.

* * * * *